United States Patent [19]

Parenti, Jr. et al.

[11] Patent Number: 4,915,998
[45] Date of Patent: Apr. 10, 1990

[54] THERMAL INSULATION BLANKET

[75] Inventors: Edmund K. Parenti, Jr., Manchester; George T. Suljak, Vernon, both of Conn.

[73] Assignee: International Fuel Cells Corporation, South Windsor, Conn.

[21] Appl. No.: 236,095

[22] Filed: Aug. 24, 1988

[51] Int. Cl.$^4$ .......................... B32B 3/02; B32B 7/02; B32B 15/14
[52] U.S. Cl. ..................................... 428/76; 428/213; 428/268; 428/422; 428/433; 428/434; 428/435; 428/457; 428/920; 428/921
[58] Field of Search ................... 428/76, 74, 920, 921, 428/422, 435, 457, 268, 213, 433, 434

[56] References Cited

U.S. PATENT DOCUMENTS 4,401,706 8/1983 Sovilla ........................... 429/920 X
4,671,979 6/1987 Adiletta ........................... 428/76 X
4,692,363 9/1987 Reiss et al. ...................... 428/76 X
4,767,656 8/1988 Chee et al. ...................... 428/920 X Primary Examiner—Thomas J. Herbert
Attorney, Agent, or Firm—William W. Jones; Edward L. Kochey, Jr.

[57] ABSTRACT

The thermal insulation blanket can be used to reduce heat loss from a device both in an ambient air environment, and in the vacuum environment of space. The blanket includes a plurality of goldized film layers with interleaved ceramic fiberglass cloth layers, which provide insulation against radiated heat loss in the space environment. Adjacent to the goldized layer is a felt or foam mat which provides insulation against conduction or convection heat loss in the ambient environment. The film and mat components are enclosed in a PTFE-coated fiber glass cloth envelope.

7 Claims, 1 Drawing Sheet

U.S. Patent
Apr. 10, 1990
4,915,998
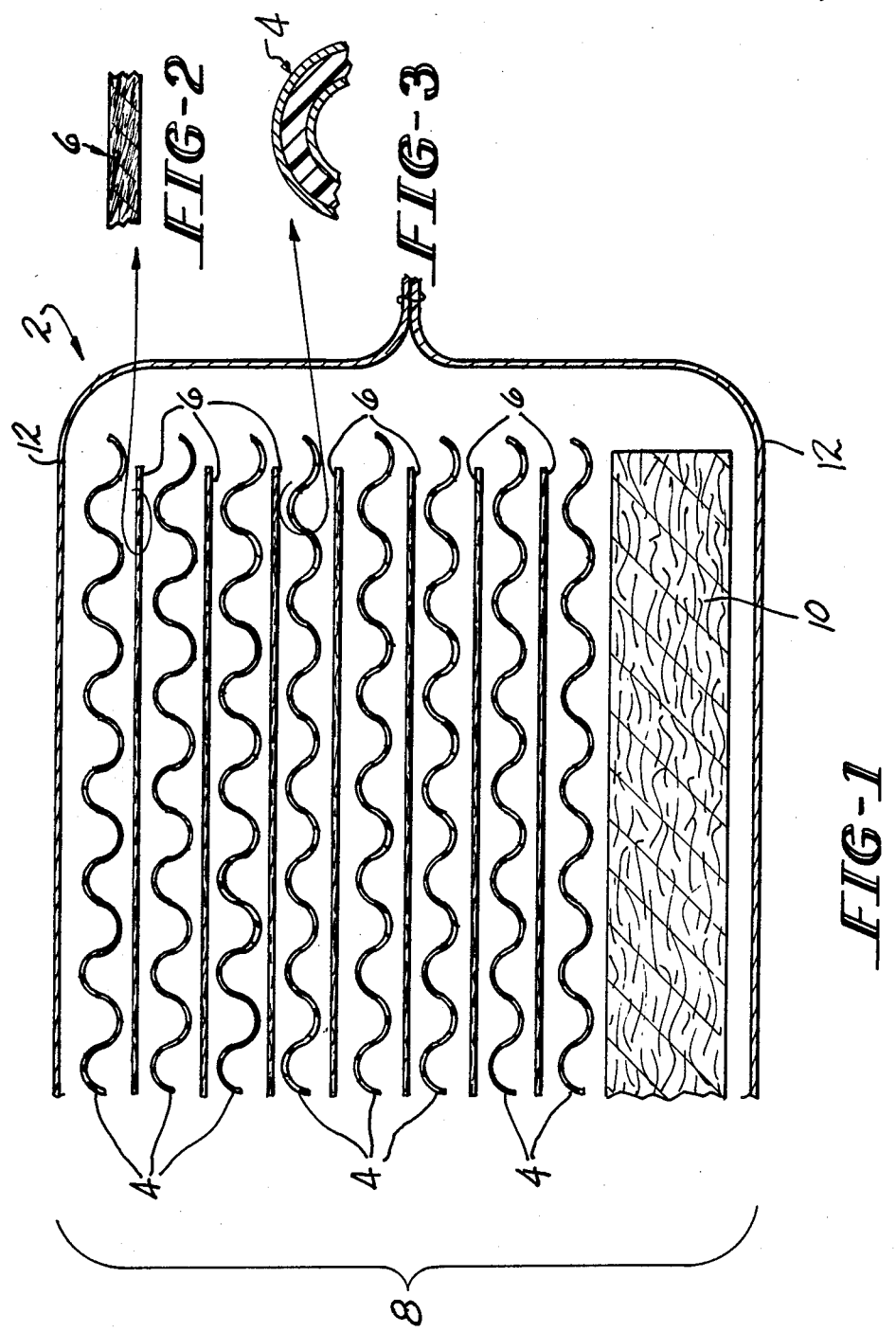

THERMAL INSULATION BLANKET

DESCRIPTION

TECHNICAL FIELD

This invention relates to an improved heat insulating blanket which can be used in ambient air and in space vacuum environments to retard heat loss from a device, such as a fuel cell power plant, or other device.

BACKGROUND ART

Fuel cell power plants which are used in space applications, such as in manned orbiters, unmanned satellites or the like will be exposed to ambient air surface conditions prior to, and during, launch, and upon re-entry, if any, and will also be exposed to space vacuum conditions when in orbit. When the fuel cell power plants are in operation, operation temperatures are sustained from the heat that they generate via the exothermic electrochemical reaction which occurs in the cells. In order to sustain operating temperatures at low operating powers and without necessity for inefficient electrical heaters, the power plant should be insulated against loss of heat. A problem arises in connection with the manner in which heat is lost from the power plant in the two different environments. In the vacuum environment of space heat is lost mainly by radiation, while in the ambient air environment heat is lost mainly by convection. The insulation used thus must be able to protect against each of these modes of heat loss. In addition, the insulation should be sufficiently flexible and yet durable so as to be able to be wrapped about the fuel cell power plant assembly, and conform closely to the surface contours thereof. This is required to eliminate formation of air paths between the insulation and the part that would permit either a forced airflow, or a "chimney" type air circulation resulting in a heat loss.

DISCLOSURE OF INVENTION

The insulation blanket of this invention is effective in both the ambient air environment and the vacuum environment of space. The blanket is lightweight and very pliant so that it can be wrapped snugly about the complex configurations of the fuel cell power plant assemblies. The blanket also resists degradation which can be caused by the corrosive environment associated with fuel cell power plant assemblies. The insulation blanket of this invention includes a heat radiation insulation portion which is effective in the space environment, and which is formed from a plurality of goldized polyimide film layers. Between each of the goldized film layers there is disposed a borosilicate ceramic fiber glass cloth operable to separate the gold film layers which would otherwise thermally "short" in space. On one side of the goldized film layers there is disposed a felt or foam layer which is operable to provide heat insulation in the ambient air operating environment. A felt such as a ceramic fiber felt of the type sold by Carborundum Corporation under the trademark Fiberfax may be used. If a foam is used, the foam would preferably be a polyimide foam. When the blanket is applied to the fuel cell assembly, the felt or foam side will be oriented innermost next to the fuel cell assembly. The felt or foam component, in addition to its heat convection and conduction insulation qualities, also provides a suppleness to the blanket which enables the latter to closely follow the contours of the assembly about which it is wrapped. The two insulation components are contained in an envelope formed from a polytetrafluorethylene-coated fiber glass cloth material which is stitched together with PTFE-coated fiber glass thread. Thus the outer surfaces of the blanket are highly resistant to damage from the corrosive nature of the fuel cell power plant assembly.

It is therefore an object of this invention to provide an insulation blanket construction for use to insulate fuel cell power plant assemblies or the like against loss of heat in an ambient air environment, and in a vacuum space environment.

It is a further object of this invention to provide an insulation blanket of the character described which resists degradation from the corrosive environment of a fuel cell power plant assembly.

It is an additional object of this invention to provide an insulation blanket of the character described which will conform closely to the shape of the power assembly when wrapped thereabout.

These and other objects and advantages of the invention will become more readily apparent from the following detailed description of a preferred embodiment thereof when considered in conjunction with the accompanying drawing which is a fragmented side sectional view of a preferred embodiment on an insulation blanket formed in accordance with this invention.

BRIEF DESCRIPTION OF THE DRAWINGS

FIG. 1 is a sectional view through the blanket;
FIG. 2 is a section through an interleaved cloth layer; and
FIG. 3 is a section through a goldized film layer of the blanket.

BEST MODE FOR CARRYING OUT THE INVENTION

The insulation blanket denoted generally by the numeral 2 includes a plurality of goldized polyimide film layers 4 with interleaved borosilicate ceramic fiber glass cloth layers 6. Preferably there are at least six of the goldized film layers 4 in the blanket 2. These layers together make up the radiation insulation side 8 of the blanket 2. The film and cloth layers 4 and 6 respectively will typically be about 0.005 inch thick, and the entire radiation insulation side 8 will be about one sixteenth of an inch in thickness. Adjacent to the radiation insulation layers 8 is a convection and conduction heat insulating pad 10 which may be formed from a felt of ceramic fiber strands, or from a polyimide foam. The pad 10 will be about one-half inch thick. In addition to its heat insulation quality, the pad 10 provides a good degree of pliancy or malleability to the blanket which increases the blanket's ability to conform to the exterior shape of any device about which it is wrapped. The heat insulation components 4 and 10 are contained in an outer envelope formed by cloth sheets 12 which are joined at their edges by non-flammable, non-evaporable PTFE-coated fiber glass thread stitches 14. The cloth sheets are formed from a weave of PTFE-coated fiber glass strands which resists degradation in the corrosive environment of the fuel cell assembly.

It will be readily appreciated that the insulation blanket of this invention possesses utility in both the ambient air and evacuated space environments, and is particularly useful for heat insulating fuel cell power assemblies used in orbiting craft launched from earth. The blanket is sufficiently malleable to conform closely to the contours of the fuel cell assembly.

Since many changes and variations of the disclosed embodiment of the invention may be made without departing from the inventive concept, it is not intended to limit the invention otherwise than as required by the appended claims.

We claim:

1. A thermal insulation blanket suitable for use in vacuum and ambient air environments, said blanket comprising: a plurality of metalized film layers interleaved with intervening ceramic fiber glass layers; a layer of a pliant thermal insulating material disposed on one side of said interleaved film and fiber glass layers, said pliant material layer imparting a pliancy to said blanket which enables said blanket to closely conform to the contours of any object about which it is wrapped; said interleaved film and fiber glass layers, as well as said pliant material layer being contained in a fiber glass cloth outer envelope and; said pliant material layer being significantly thicker than the sum total of said interleaved film and fiber glass layers, in the order of at least four times.

2. The thermal insulation blanket of claim 1 wherein said metalized film layers are goldized.

3. The thermal insulation blanket of claim 2 wherein said pliant material layer is a ceramic fiber felt material.

4. The thermal insulation blanket of claim 2 wherein said pliant material layer is a polyimide foam layer.

5. The thermal insulation blanket of claim 3 wherein said intervening ceramic fiber glass layers are borosilicate ceramic fiber glass cloth.

6. The thermal insulation blanket of claim 4 wherein said intervening ceramic fiber glass layers are borosilicate ceramic fiber glass cloth.

7. The thermal insulation blanket of claims 5 or 6 wherein said fiber glass outer envelope is a polytetrafluoroethylene-coated fiber glass cloth.

* * * * *

UNITED STATES PATENT AND TRADEMARK OFFICE
CERTIFICATE OF CORRECTION

PATENT NO.  : 4,915,998
DATED       : April 10, 1990
INVENTOR(S) : Edmund K. Parenti, Jr. & George T. Suljak It is certified that error appears in the above-identified patent and that said Letters Patent is hereby corrected as shown below:

Column 1, between lines 1 and 2 insert the following paragraph

--The invention described herein was made in the performance of work under NASA Contract No. NAS10-11500 and is subject to the provisions of Section 305 of the National Aeronautics and Space Act of 1958 (42 U.S.C. 2457).--

Signed and Sealed this

Twenty-eighth Day of September, 1993

*Attest:*

BRUCE LEHMAN

*Attesting Officer*  *Commissioner of Patents and Trademarks*